United States Patent
Lehmann et al.

(10) Patent No.: US 10,005,530 B2
(45) Date of Patent: Jun. 26, 2018

(54) DEVICE FOR IMPROVING THE WATER INFLUX TOWARDS A PROPELLER OF A WATERCRAFT

(71) Applicant: BECKER MARINE SYSTEMS GMBH & CO. KG, Hamburg (DE)

(72) Inventors: Dirk Lehmann, Winsen/Luhe (DE); Friedrich Mewis, Dresden (DE)

(73) Assignee: becker marine systems GmbH & Co. KG, Hamburg (DE)

( * ) Notice: Subject to any disclaimer, the term of this patent is extended or adjusted under 35 U.S.C. 154(b) by 0 days. days.

(21) Appl. No.: 14/889,491

(22) PCT Filed: Mar. 31, 2014

(86) PCT No.: PCT/EP2014/056412
§ 371 (c)(1),
(2) Date: Nov. 6, 2015

(87) PCT Pub. No.: WO2014/180605
PCT Pub. Date: Nov. 13, 2014

(65) Prior Publication Data
US 2016/0090163 A1 Mar. 31, 2016

(30) Foreign Application Priority Data

May 6, 2013 (DE) .................... 20 2013 101 943 U

(51) Int. Cl.
*B63H 1/28* (2006.01)
*B63H 5/16* (2006.01)
*F04D 29/40* (2006.01)

(52) U.S. Cl.
CPC ............... *B63H 1/28* (2013.01); *B63H 5/16* (2013.01); *F04D 29/40* (2013.01); *Y02T 70/542* (2013.01)

(58) Field of Classification Search
CPC ........ B63H 1/18; B63H 1/28; B63H 2001/18; B63H 2001/28; B63H 1/30; B63H 2001/30; B63H 5/16; B63H 5/165; F04D 29/40

(Continued)

(56) References Cited

U.S. PATENT DOCUMENTS 5,634,613 A * 6/1997 McCarthy ............... B64C 23/06
244/130
5,906,522 A * 5/1999 Hooper .................. B63H 20/34
416/247 A (Continued)

FOREIGN PATENT DOCUMENTS

CN 101811567 A 8/2010
CN 102020011 A 4/2011

(Continued)

OTHER PUBLICATIONS

Becker Marine, "Unveils New Energy-Saving Device", World Maritime News (http://worldmaritimenews.com/archives/76721/germany-becker-marine-unveils-new-energy-saving-device/) Feb. 15, 2013.

(Continued)

*Primary Examiner* — Daniel V Venne
(74) *Attorney, Agent, or Firm* — Kelly & Kelley, LLP

(57) ABSTRACT

The invention relates to a device for reducing the driving power requirement of a watercraft, comprising a flow guiding surface from which at least one first fin projects. A first end of said first fin is fixed to the flow guiding surface, and a second end of the first fin is embodied as a free end.

23 Claims, 11 Drawing Sheets

(58) Field of Classification Search
USPC .................................................. 440/66, 71
See application file for complete search history.

(56) References Cited

U.S. PATENT DOCUMENTS

| | | | |
|---|---|---|---|
| 7,267,589 B2* | 9/2007 | Norman ................. | B63H 20/00 440/67 |
| 8,123,578 B2* | 2/2012 | Mewis .................... | B63H 5/16 440/66 |
| 8,944,869 B2* | 2/2015 | Lehmann ................ | B63H 5/16 440/66 |
| 2013/0059491 A1 | 3/2013 | Lehmann et al. | |

FOREIGN PATENT DOCUMENTS

| | | | | |
|---|---|---|---|---|
| CN | 202244050 U | | 5/2012 | |
| KR | 20020042974 A | | 6/2002 | |
| KR | 20100097000 A | | 9/2010 | |
| KR | 20120068250 A | | 6/2012 | |
| KR | 20120124205 A | * | 11/2012 | ............... B63H 1/28 |

OTHER PUBLICATIONS

FathomShipping, "Propulsion-Enhancing Fins Installed on Hamburg Süd Containerships", gCaptain.com (http://gcaptain.com/propulsion-enhancing-fins-installed/) Mar. 8, 2013.
Office Action of the Chinese Application No. 201480036775.2 dated Feb. 4, 2017.
International Search Report of the International Application No. PCT/EP2014/056412 dated Jul. 31, 2014.

* cited by examiner

DEVICE FOR IMPROVING THE WATER INFLUX TOWARDS A PROPELLER OF A WATERCRAFT

FIELD OF THE INVENTION

The invention relates to a device for improving the water influx towards a propeller of a watercraft, thus reducing the drive power demand of a watercraft, in particular a ship. The device according to the invention is in particular suitable for a drive system of a watercraft for improving the efficiency of a propeller, thus the energy efficiency of the watercraft.

BACKGROUND OF THE INVENTION

Devices for reducing the drive power demand of a watercraft are known from the prior art. In EP 2 100 808 A1 such a device comprises, for example, a fore-nozzle. This fore-nozzle is in particular mounted at a short distance or directly upstream of the propeller when viewed in the direction of travel of the ship. Furthermore, fins, i.e. (guide) fins or hydrofoils, are provided in the fore-nozzle. The fore-nozzle substantially has the shape of a flat cone section, where both openings, both the water inlet and the water outlet opening, are configured as a substantially circular opening and the water inlet opening has a larger diameter than the water outlet opening. As a result, it is possible to improve the propeller inflow and to reduce the losses in the propeller jet by specific generation of pre-swirl by the fins installed in the fore-nozzle. A significant reduction in the drive power demand and therefore a saving of fuel can be achieved by such a system.

The previously known device described above, however, has a relatively large resistance for the propeller inflow so that the reduction in the drive power demand in the relevant extent is primarily only established in slower or more heavily laden ships, so that the known device is usually only used in such ships.

It is therefore the object of the present invention to provide a device for reducing the drive power demand of a watercraft which can also be used particularly effectively in fast and very fast watercraft, for example ships having a speed of 20 knots or more or 25 knots and more.

This object is solved whereby in a device for improving the water influx towards a propeller of a watercraft, comprising a flow-guiding device, at least a first fin projects from the flow-guiding device in such a manner that a first end of the first fin is fastened to the flow-guiding surface and a second end of the first fin is configured as a free end.

The flow-guiding surface can be formed in one part or in one piece or be composed of several individual parts to form a flow-guiding surface, where the individual parts are preferably welded to one another or welded to the hull.

The flow-guiding surface can in principle have all possible shapes. At the same time, the flow-guiding surface is disposed and configured in such a manner that the water flow can be guided by it at least partially onto a propeller. For example, the flow-guiding surface can have the shape of a square or rectangular plate. Furthermore, arcuate or curved configurations are feasible. In cross-section, an arcuately-configured flow-guiding surface can have a circular section, an elliptical section or an otherwise-curved shape. The flow-guiding surface has a length in the flow direction, for example, in the direction of travel of the watercraft. Furthermore, in a plate-shaped configuration, the flow-guiding surface has a width or in an arcuate configuration, it has an arc length. The thickness of the flow-guiding surface is hereinafter designated as profile thickness. Both the length and also the width or arc length and the profile thickness can be constant over the entire area of the flow-guiding surface or they can have different values. For example, the flow-guiding surface can also be profiled. In this case, for example, one edge of the flow-guiding surface could be configured to be rounded and have a thinner profile thickness than the central region of the flow-guiding surface.

According to the invention, the first fin is connected at a first end in a suitable manner to the flow-guiding surface, or is fastened to the flow-guiding surface. For example, the first fin at its first end can be welded or flange-mounted to the flow-guiding surface. The second end of the first fin according to the invention is configured as a free end. Consequently, the first fin can project from the flow-guiding surface in any arbitrary direction, where the second end of the first fin is not connected to the flow-guiding surface or is otherwise fastened to the ships' hull. The term "fin" is to be understood as any guide fin or a hydrofoil which is preferably arranged fixedly on the flow-guiding surface. At the same time, the term "fin" can be understood as any guide device which influences the propeller inflow, where the fin usually has a hydrofoil profile, i.e. a suction and a pressure side. Thus, fins in the present connection are flow guiding surfaces in the sense of stators which are arranged on the flow-guiding surface and influence the propeller inflow. In particular, it is preferred that the fins have an, in particular circular-arc-shaped, outwardly curved suction side and a substantially flat pressure side.

The profile of the first fin can be uniform or different when observed over its length. In particular, the profile can be turned into itself, i.e. twisted, when viewed along the longitudinal direction of the first fin. Consequently, the first fin in addition to the flow-guiding surface also serves as a guiding surface for the water flow, where the flow-guiding surface and the first fin are arranged at an angle to one another and preferably the first fin is configured to be smaller than the flow-guiding surface. Length of the first fin is understood to be the distance between the first end and the second end of the first fin. Depth of the first fin is understood to be the depth of the fin in the longitudinal direction of the flow-guiding surface, that is in the direction of travel of the watercraft. The thickness of the fin is hereinafter designated as profile thickness.

First fin in the sense of the present invention is to be understood as all fins which project from the flow-guiding surface and are connected with a first end to the flow-guiding surface and whose second end is configured as a free end. Preferably a plurality of such first fins can be provided.

Preferably the flow-guiding surface is disposed upstream of a propeller. This means that the flow-guiding surface is disposed in the direction of travel of the watercraft, or the ship, upstream of a propeller of the watercraft. The designation "in the direction of travel" is to be understood here as the forwards direction of travel of a ship or a watercraft.

In this case, it is further provided that the flow-guiding surface is located at a distance from the propeller. Furthermore, it is preferred that the flow-guiding surface is located at a distance from a shaft bearing, in particular a stern tube. A stern tube is used for mounting a propeller shaft of the propeller of the watercraft or the ship. For this purpose the flow-guiding surface can be arranged at least in sections above, below or also laterally of the propeller axis. Furthermore, the flow-guiding surface can at least partially enclose the propeller axis or the shaft bearing. Particularly preferably the flow-guiding surface is disposed in an arcuate shape above and at a distance from the propeller axis or the propeller shaft. In this case, the arcuately configured flow-guiding surface can also be configured to be closed in the circumferential direction. Preferably however, an arcuate flow-guiding surface has a cross-section of an eighth ring, a quarter ring. It is further preferred that the flow-guiding surface has a cross-section of a half ring, a two-thirds ring or a three-quarters ring.

Furthermore, the flow-guiding surface can be configured to be arcuate and circumferentially open, where the flow-guiding surface does not have a circular cross-section but for example, has an elliptical cross-section. Preferably the flow-guiding surface is configured to be convex with respect to the propeller axis.

In the case of an arcuate configuration of the flow-guiding surface, the arc length of the flow-guiding surface in a cross-sectional view is preferably less than 80%, particularly preferably less than 60%, quite particularly preferably less than 40% or 30% of the circumference of the conceptually circumferentially closed flow-guiding surface.

In principle however, other cross-sections are also feasible. For example, the flow-guiding surface can have an angled, for example, a rectangular cross-section. Furthermore a U-shaped configuration of the flow-guiding surface would be feasible.

As a result of the arrangement of a first fin on the flow-guiding surface, where a first end of the first fin is fastened to the flow-guiding surface and a second end of the first fin is configured as a free end, it can be achieved that the dimensions, for example, the length or the width or the arc length and/or the profile thickness of the flow-guiding surface can be reduced considerably compared with the devices known from the prior art where nevertheless those regions in which the flow losses are particularly high and in which a swirl must be produced for efficient operation can still be reached by the first fin.

In addition, it is preferred that the second end of the first fin starting from the flow-guiding surface is directed away from the propeller axis. That means that the distance from the first end of the first fin to the propeller axis is shorter than the distance from the second end (free end) of the first fin to the propeller axis.

Consequently, the flow-guiding surface can be disposed at a distance from the propeller shaft, where the distance between propeller shaft and the flow-guiding surface is shorter compared to the prior art. Since the first fin protrudes from the flow-guiding surface in such a manner that its second end is directed away from the propeller axis, it is further ensured that the first fin extends sufficiently far from the propeller shaft (when viewed in the radial direction from the propeller shaft) and consequently can still positively influence the inflow onto the respectively associated propeller.

By attaching a fin to the flow-guiding surface, the distance from the flow-guiding surface to the propeller shaft and also the profile thickness of the flow-guiding surface and therefore the resistance can thus be reduced so that the device can now also be used for fast and very fast ships where the positive effects for the reduction of the drive power demand are still preserved or optionally even improved. Since the first fin projects outwards from the flow-guiding surface and possibly not from the propeller hub or the stem tube, this can extend relatively far outwards when viewed from the propeller axis and nevertheless still have sufficient strength, particularly in regard to bending stresses.

Preferably the first fin has a greatest profile thickness, where this greatest profile thickness of the first fin is less than 50%, particularly preferably less than 25%, and quite particularly preferably less than 15% of the distance between the first end and the second end of the first fin. Thus, the profile thickness of the first fin at its thickest point is less than the length of the first fin between its first end and its second end.

In principle, the flow-guiding surface can be disposed parallel to the propeller axis or parallel to the propeller shaft. This means that the distance between flow-guiding surface and propeller axis is substantially the same in each region. Preferably however the flow-guiding surface is disposed inclined with respect to the propeller axis towards the rear or towards the front. In this case, the flow-guiding surface is preferably configured to be profiled. The flow-guiding surface thus has a profile inlet edge which is directed away from the propeller and on which the water flow impinges in the direction of travel of the watercraft in the forwards direction of travel. The profile outlet edge of the flow-guiding surface is directed towards the propeller. The profile inlet edge and the profile outlet edge thus comprise the two front-side edges of the flow-guiding surface. In the case of a flow-guiding surface which is inclined with respect to the propeller axis towards the rear, the distance between propeller axis and flow-guiding surface is therefore greater in the region of the profile inlet edge than in the region of the profile outlet edge. As a result of such an arrangement of the flow-guiding surface, the inflow onto the propeller can be particularly advantageously influenced in certain regions. In the case of a flow-guiding surface arranged at an inclination to the propeller axis, the longitudinal axis of the flow-guiding surface thus does not run parallel to the propeller axis but at an angle and as a result is inclined in relation to the propeller axis.

Preferably the shortest distance between flow-guiding surface and propeller axis is less than half the propeller diameter or less than the radius of the propeller. In the case of a flow-guiding surface arranged at an inclination to the propeller axis towards the rear, the distance between flow-guiding surface and propeller axis in the region of the profile outlet edge of the flow-guiding surface is therefore shorter than half the propeller diameter.

Preferably at least one second fin is further provided which projects from the flow-guiding surface. In this case, the second fin is disposed with its first end on the flow-guiding surface or fastened to this and with its second end is disposed on a shaft bearing, in particular stern tube, or fastened to this. Consequently, the second fin starting from the flow-guiding surface is directed towards the propeller axis and in contrast to the first fin, has no free end but is connected to the hull or the shaft bearing. Consequently, the second fin runs between two fixed bearing points from the shaft bearing to the flow-guiding surface. Between the two ends, the second fin preferably has a pressure side, a suction side, a nose strip and an end strip. This configuration also applies similarly for the first fin which projects outwards with a free end from the flow-guiding surface. Depending on the configuration of the hull, the second fin can be mounted, instead of on a shaft bearing, directly on the hull or on the plating of the hull with its second end.

"Second fin" is to be understood in the sense of the present invention as all fins which protrude from the flow-guiding surface and are connected with their first end to the flow-guiding surface and are connected with their second end to the shaft bearing or the hull. Preferably a plurality of such second fins can be provided.

It is furthermore expedient that the first fin and/or the second fin are arranged substantially in the radial direction to the longitudinal axis of the flow-guiding surface or to the propeller axis of a drive propeller of a watercraft. Preferably both fins, the first and also the second fin, are arranged in the radial direction. In principle, the first fin and also the second fin are arranged at different angles to their respective tangents. The tangent for the first fin runs through a point on the outer wall surface of the flow-guiding surface whereas the tangent for the second fin runs through a point of the inner wall surface of the flow-guiding surface. Outer wall surface of the flow-guiding surface is to be understood as the wall surface directed away from the propeller axis or propeller shaft. On the other hand, inner wall surface is to be understood as the wall surface of the flow-guiding surface which is directed towards the propeller axis or the propeller shaft.

It is further preferred that the extension of the individual fins (first fin and also second fin) in the longitudinal direction of the flow-guiding surface is smaller or shorter than the length of the flow-guiding surface. "Extension" is to be understood as the region or the length of the longitudinal profile of the flow-guiding surface over which the fins stretch in the longitudinal direction of the flow-guiding surface. Particularly preferably the extension of the individual fins in the longitudinal direction of the flow-guiding surface is less than 90%, quite particularly preferably less than 80% or even less than 60% of the length of the flow-guiding surface. The longitudinal direction substantially corresponds to the direction of flow. It is further preferred that the fins are disposed substantially in the rear region, that is in the region facing the propeller, of the flow-guiding surface. In principle however, a configuration of the fins over the entire extension of the flow-guiding surface in the longitudinal direction or even a central or front arrangement of the fins in relation to the direction of travel would also be possible.

The respective two first ends of the first and the second fin are fastened on the flow-guiding surface. Advantageously, the first end of the first fin can either be fastened on the outer wall surface of the flow-guiding surface, for example, by flange-mounting or also guided into the flow-guiding surface profile, that is the wall of the flow-guiding surface. Alternatively it is also possible to guide the first fin through the guiding surface profile or the flow guiding surface. The first end of the first fin thus forms the root of the first fin and the second end forms the tip of the first fin.

All the possible configurations described for the first fin can also be transferred similarly to the configuration of the second fin and conversely or can be applied there.

The flow-guiding surface can preferably be connected via the second fin to the hull. Additionally or alternatively, the flow-guiding surface can also be connected to the hull via further connecting means, for example "brackets" or retaining clips or shaft bracket arms located for example below or above the flow-guiding surface. The shaft bracket arms could also be configured as fins at least in certain areas.

In a preferred embodiment, a plurality of first and second fins are provided. This means that a plurality of fins are provided which protrude from the flow-guiding surface outwards in such a manner that they are connected to the flow-guiding surface with their respective first end and are arranged to be free-standing with their respective second end. Furthermore, a plurality of fins are provided which are connected with their first end to the flow-guiding surface and are connected with their second end to the hull or the propeller shaft. In particular, it is preferred that a same number of first fins and second fins is provided. In principle, however it would also be possible to provide an unequal number of first and second fins.

It is particularly preferred that the device has at least three first fins and/or at least three second fins, preferably three to seven first fins and/or three to seven second fins. In a preferred embodiment, an odd number of first fins and/or second fins can be provided.

It is further preferred that more first fins are provided on the propeller upwards-beating side of the flow-guiding surface than on the propeller downwards-beating side of the flow-guiding surface and/or that more second fins are provided on the propeller upwards-beating side of the flow-guiding surface than on the propeller downwards-beating side of the flow-guiding surface. The term "propeller upwards-beating side of the flow-guiding surface" is understood as that side of the flow-guiding surface on which the propeller arranged downstream of the flow-guiding surface in a frontal view of the flow-guiding surface turns from bottom to top when travelling forwards. Accordingly on the propeller downwards-beating side the propeller turns from top to bottom. The embodiment described in the present case can therefore be used particularly expediently in flow-guiding surfaces whose central longitudinal axis of rotation is not displaced laterally with respect to the propeller axis but rather lies in a plane standing vertically on the propeller axis so that with an imaginary division of the flow-guiding surface by a central vertical axis one half of the flow-guiding surface lies on the propeller upwards-beating side and the other half lies on the propeller downwards-beating side.

In order to minimise the rotational losses at the propeller and to reduce twisting in the propeller backwash induced by the propeller inflow perturbed by the hull of the ship, a (pre-)swirl is produced by the fins (first fins or second fins) disposed on the flow-guiding surface which is aligned in such a manner that a smaller twisting of the flow is established downstream of the propeller in the propeller backwash region compared to a propeller without a flow-guiding surface with fins placed in front. The twisting of the propeller backwash is now particularly small if at least one first fin and/or one second fin more is disposed on the propeller upwards-beating side than on the propeller downwards-beating side.

Alternatively or additionally to the distribution of the first fins and/or second fins on the propeller upwards-beating side and propeller downwards-beating side, the first fins and/or the second fins can form an asymmetric first fin system or an asymmetric second fin system. Here, an asymmetry relates, for example, to an angular arrangement of the fins with respect to the propeller axis and/or their dimensioning such as profile length, profile cross-section or another quantity. In the case of an asymmetry in relation to the angular arrangement directed onto the propeller axis, an unequal angular distribution is established between the axes of the individual first fins and/or second fins when viewed in the radial direction from the propeller axis. An asymmetric arrangement can also be present if the vertical central axis of the flow-guiding surface is used as the axis of symmetry. This axis of symmetry usually at the same time divides the upwards-beating and downwards-beating side of the flow-guiding surface. This results in a particularly effective first fin system or second fin system in a manner which is easy to configure and arrange.

In a further preferred embodiment, the at least one first fin is arranged in extension of the at least one second fin so that both together form a complete fin. Thus, for example, the longitudinal axes of the first fin and the second fin can substantially stand on one another and/or the first fin and the second fin are disposed on a common radial axis. Preferably the first end of the second fin, which is expediently disposed on the inner wall surface of the flow-guiding surface is located opposite the first end of the first fin which is disposed on the outer wall surface of the flow-guiding surface so that only the flow-guiding surface lies between the two fins. In principle, both end regions could each be introduced into the profile of the flow-guiding surface or into the flow-guiding surface so that these then possibly abut against one another or are only slightly spaced apart from one another. It is also possible to use a continuous fin which is guided through a recess in the flow-guiding surface and of which one subsection forms a first fin and another subsection forms a second fin. As a result of this preferred arrangement of the two fins, fluidically a single fin is obtained which expediently runs from the shaft bearing to the free end of the first fin. If a plurality of first fins and second fins, in particular the same number of first fins and second fins are provided, these are each advantageously arranged in fin pairs which then each form complete fins. Thus, for example, three first fins and three second fins could together form three complete fins.

Compared to the pure stator arrangements known from the prior art or arrangements with fins without flow-guiding surface, projecting radially from the stern tube, a significantly increased strength of the entire arrangement is obtained through the provision of the flow-guiding surface. As a result, the complete fins can be designed to be sufficiently long with an ensured fatigue strength in order to optimally influence the inflow onto the propeller or achieve the best possible efficiency. In the arrangements known from the prior art with long fins without flow-guiding surface, a fatigue strength is frequently not achieved.

The length of the complete fin can generally be larger or smaller than the radius of a propeller of the watercraft. The length of the complete fin is measured from the propeller axis to the outermost (free) end of the first fin, where optionally the flow-guiding surface disposed between the two fins (first and second fin) is also included. Preferably the length of the complete fin is a maximum of 90% of the radius of the propeller, particularly preferably a maximum of only 75%. However, a sufficient strength of the device is thereby achieved.

In a further preferred embodiment, the first fin and/or the second fin are disposed at an angle of attack radially to the propeller axis. In particular, the first fin and the second fin can have different angles of attack. If a plurality of first fins and/or second fins are provided, these can also have different angles of attack amongst one another. By setting the different angles of attack, it is possible to optimise a pre-swirl. The angle of adjustment is, for example, enclosed by a chord running from the nose strip to the end strip of the respective fin or also the longitudinal axis of the fin in cross-sectional view and the propeller axis.

In a further preferred embodiment the first fin has a free end which forms the region of the first fin most remote from the flow-guiding surface. At this free end region a fin end piece protrudes from the first fin. Thus, for example, a longitudinal axis of this fin end piece can be located at an angle to the longitudinal axis of the first fin. The term "protruding fin end piece" in the present case generally means all the components disposed in the region of the free end of the first fin which are not disposed precisely in the extension of the first fin but protrude obliquely from the first fin or at a specific angle from the first fin or deviate from the fictitiously extended profile contour of the first fin. The fin end piece therefore protrudes from the fin plane. Such a protruding fin end piece acts similar to the "winglets" known from aircraft aerofoils and reduces the probability of vortices becoming detached in the end region of the first fin and of cavitation occurring in the same.

The fin end piece can go over into the free end region of the first fin at a radius. Alternatively the fin end piece can be mounted at an angle on the free end of the first fin so that the fin end piece plane and the plane over which the first fin extends are at this angle.

In principle, the fin end piece can protrude on both sides, i.e. both on the pressure side and on the suction side, of the first fin from this or only on one of the two sides. In the last embodiment it is preferred that the fin end pieces only protrude towards the suction side of the first fin since as a result greater hydrodynamic effects in relation to the reduction of vortex formation can be achieved. For the embodiment in which the fin end piece protrudes or projects on both sides of the first fin, two separate fin end pieces can also be provided which then each protrude on one side. In principle, however in this embodiment a one-piece design of the fin end piece is possible.

It is further preferred that in the presence of at least one first fin and one second fin, the first fin has a larger length than the second fin. In particular, the length of the first fin can be at least one and a half times, preferably at least twice as large as the length of the second fin. As a result of this embodiment, an improved effect in relation to the drive power demand and in relation to the stability of the device is achieved. As a result of the length distribution in this preferred embodiment, the flow-guiding surface is disposed relatively close to the shaft bearing of the propeller shaft so that the device has a relatively low resistance and can also be used for very fast ships. Generally, however, any design is possible in which the second fin has a greater length than the first fin, e.g. at least one and a half times or at least twice the length or in which both fins have approximately the same length.

In order to ensure a sufficiently low resistance of the device, according to a further embodiment it can be provided that the profile thickness of the flow-guiding surface is no more than 10%, preferably no more than 7.5%, particularly preferably no more than 6% of the length of the flow-guiding surface. Here the maximum profile thickness and the maximum extension in the longitudinal direction, i.e. from the profile inlet edge to the profile outlet edge of the flow-guiding surface, should be used. By this means, the resistance of the device is also further reduced.

In a further preferred embodiment, a stabilizing strut is further provided which is disposed between shaft bearing and inner side of the flow-guiding surface and is fastened both on the shaft bearing and on the flow-guiding surface. Such a stabilizing strut can be provided if according to local conditions or particular configuration of the device, an additional stabilization or retaining of the device or the flow-guiding surface is desired. The strut can generally be configured as a normal compression or tension rod without flow-guiding properties. Alternatively, the stabilizing strut itself can also have a fin profile, i.e. a hydrofoil profile or similar for specific influencing of the propeller inflow, for example, to produce pre-swirl.

The first fin and/or the second fin can further be configured to be swept. The term "swept" familiar, inter alia, from air travel, is to be understood in the present context as an angular deviation of the first fin and/or the second fin in relation to an orthogonal of the longitudinal axis of the flow-guiding surface. In this case, the leading edge and/or trailing edge of the fin (first fin and/or second fin), when viewed in the direction of flow, can be inclined at an angle with respect to the orthogonal (these states are known as leading-edge sweep or trailing-edge sweep).

In a preferred embodiment only the leading edge of the first fin and/or the second fin is inclined with respect to the orthogonal or located at an angle to the orthogonal and the trailing edge is aligned approximately parallel to the orthogonal. There can also be embodiments in which only the first fin is configured to be swept but not the second fin.

In a further preferred embodiment, both the first fin and the second fin are configured to be swept. This can in particular be preferred when the flow-guiding surface comprises at least one complete fin where the complete fin is then particularly preferably configured to be continuously swept, i.e. with the same angular deviations of the leading edges and/or the trailing edges of the first fin and the second fin to the orthogonal of the longitudinal axis of the flow-guiding surface.

It is further preferred that the flow-guiding surface is configured as a nozzle and particularly preferably as a fore-nozzle. For this purpose, the flow-guiding surface is shaped in such a manner that it not only has the property to guide the flow specifically onto the propeller but additionally is also shaped in such a manner that the inflow velocity is increased at least in sections. This can be provided, for example, with an arcuately configured flow-guiding surface in which the radius of the ring (in a cross-sectional view) in the longitudinal direction of the flow-guiding surface decreases from front to back towards the propeller.

Fore-nozzle is to be understood as a nozzle which is disposed upstream of the propeller of the watercraft in the direction of travel of the ship or watercraft.

In a preferred embodiment wherein the flow-guiding surface is configured as a nozzle or fore-nozzle, no propeller is disposed inside the nozzle or fore-nozzle, other than for example in Kort nozzles or rudder propellers. Furthermore, the nozzle or fore-nozzle and also the flow-guiding surface not configured as a nozzle is disposed at a distance from the propeller. The nozzle or fore-nozzle is configured in such a manner that the through-flowing water flow is guided at least partially onto the propeller located thereafter. Usually the nozzle or fore-nozzle will have a tubular shape. However, any other cross-sectional shape, for example, an angled cross-sectional shape is also feasible.

The nozzle or fore-nozzle can be configured in one part or one piece or be composed of several individual parts to form a nozzle or fore-nozzle, wherein the individual parts are preferably welded to one another or to the hull. Preferably at least one partial region of the nozzle or fore-nozzle is located underneath the propeller shaft of the ships' propeller.

Generally it is possible that the nozzle or fore-nozzle only comprises a partial section of a nozzle or a nozzle ring (for example, a quarter nozzle ring, a third nozzle ring, a half nozzle ring, etc.). In such an embodiment the nozzle or fore-nozzle is configured to be open when viewed over the circumference.

Preferably however the nozzle or fore-nozzle is configured to be closed in the circumferential direction. For this purpose the nozzle or fore-nozzle can be configured to be continuous about 360 degrees in the circumferential direction. In the case of a nozzle or fore-nozzle configured to be multipart, furthermore, in particular with a closed nozzle circumference, the individual parts of the nozzle or fore-nozzle can be connected to the hull and/or the stern tube so that the hull and/or the stern tube then form a part of the nozzle circumference.

In all the aforesaid embodiments of the device, the flow-guiding surface can be configured as a nozzle or fore-nozzle. In such a configuration, the first fins are arranged projecting outwards from the nozzle or fore-nozzle. Therefore in such an embodiment the first fins are also called outer fins. On the other hand, when a flow-guiding surface is provided as a nozzle or fore-nozzle, the second fins are arranged inside the nozzle or fore-nozzle. These second fins are accordingly also called inner fins.

As a result of the preferred circumferentially closed profile of the nozzle or fore-nozzle, these have an inner region which is enclosed by the nozzle jacket of a nozzle or fore-nozzle which is conceptually closed at both openings (water inlet and water outlet opening). The at least one outer fin is now preferably arranged outside this inner region and rather protrudes outwards when viewed from the fore-nozzle or nozzle. In particular, the at least one outer fin can project from the outer side of the nozzle or fore-nozzle.

In contrast to the prior art, a fin pertaining to the nozzle or fore-nozzle, the at least one outer fin, is now provided outside the nozzle or fore-nozzle. Expediently at least one end region of the outer fin is disposed on the outer wall surface of the nozzle or fore-nozzle and projects outwards from this. That is, the remaining region of the at least one outer fin is located at a distance from the nozzle or fore-nozzle. As a result of providing a fin outside on a nozzle or fore-nozzle for the first time, it is now achieved that the diameter and/or profile thickness of the nozzle or fore-nozzle can be reduced significantly compared with the devices known from the prior art and the at least one outer fin nevertheless reaches those regions in which the flow losses are particularly high and in which a swirl must be produced for efficient operation. If the diameter in the devices known from the prior art were to be simply reduced, the fins would in contrast to the present invention not extend sufficiently far from the propeller hub (when viewed in the radial direction from the propeller hub) and thus would no longer or only to a small extent have a positive influence on the inflow to the propeller assigned in each case.

By attaching one or more outer fins to the outer side of the fore-nozzle or nozzle, the diameter of the nozzle or fore-nozzle and therefore the resistance thereof can be reduced so that the device can now also be used for fast and very fast ships where the positive effects on the reduction of the drive power demand are maintained or optionally even improved. Since the outer fin projects outwards from the nozzle or fore-nozzle and possibly not from the propeller hub or the stern tube, this can extend relatively far outwards when viewed from the propeller axis and nevertheless still have sufficient strength, in particular in relation to bending stresses.

The nozzle or fore-nozzle can be configured to be rotationally symmetrical or rotationally asymmetrical. Furthermore, the nozzle or fore-nozzle can be disposed concentrically with the propeller axis or eccentrically thereto. In particular, the axis of rotation and/or the longitudinal axis of the nozzle or fore-nozzle can be arranged upwardly and/or laterally offset with respect to the propeller axis. Furthermore, the nozzle or fore-nozzle can be arranged in such a manner that its axis of rotation or its longitudinal axis runs parallel to the propeller axis or runs at an angle to the propeller axis and consequently is inclined in relation to the propeller axis. The nozzle or fore-nozzle is furthermore preferably aligned centrally in the horizontal direction, relative to the propeller axis. As a result, the axis of rotation of the nozzle or fore-nozzle and the propeller axis lie in a vertical plane. Generally however a twisted arrangement of the nozzle or fore-nozzle with respect to a vertical running through the propeller axis or a parallel thereto is also possible.

The displacement of the nozzle or fore-nozzle with respect to the propeller axis upwards and/or to the side can be advantageous particularly because the water speed is usually faster in the lower region of the fore-nozzle or the propeller than in the upper region as a result of the shape of the ship or the configuration of the hull. As a result of the displacement of the fore-nozzle with respect to the propeller axis, adapted to the particular configuration of the hull, a homogenisation of the propeller inflow and therefore a better efficiency can possibly be achieved.

Expediently the fore-nozzle consists of a continuous and/or one-piece annular body or nozzle ring. The preferred embodiment can also be used in multi-propeller ships where a nozzle or fore-nozzle is then expediently to be assigned to each propeller. The propellers assigned to the device are usually installed fixed or in a fixed position on the hull. The fore-nozzle or nozzle together with the propeller of the watercraft forms a drive system.

Furthermore, it is advantageous if the diameter of the nozzle or fore-nozzle is no more than 85%, preferably no more than 70%, particularly preferably no more than 50% or no more than 35% of that diameter of the propeller to which the nozzle or fore-nozzle is assigned. This also ensures that the nozzle profile or the nozzle ring overall is not too large and therefore the resistance of the nozzle or fore-nozzle is so low that it is possible to also use the device in fast and very fast ships. If the nozzle or fore-nozzle should not be rotationally symmetrical or cylindrical or conical, instead of the diameter, the greatest extension of the nozzle or fore-nozzle in height or width can be related to the propeller diameter. Furthermore, the outside diameter of the fore-nozzle should expediently be used.

BRIEF DESCRIPTION OF THE DRAWINGS

The invention is explained in further detail hereinafter by means of the exemplary embodiments shown in the drawings. In the figures shown schematically.

DETAILED DESCRIPTION OF THE PREFERRED EMBODIMENTS

In the various embodiments shown in the following, the same components are provided with the same reference numbers.

Figure 1:
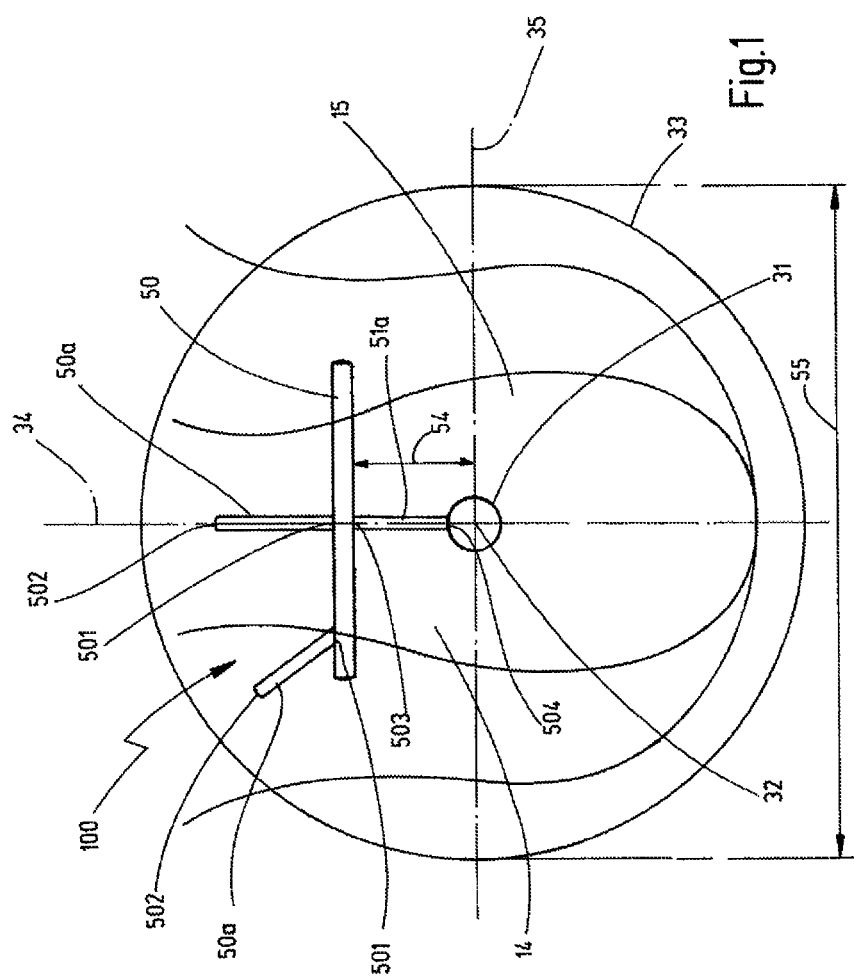
FIG. 1 shows a rear view of a lower region of a hull with a flow-guiding surface configured in a plate shape, arranged upstream of the propeller.

FIG. 1 shows a rear view of the rear lower region of a hull 30. A shaft bearing 31 configured as a stern tube projects from the hull 30 from the stern approximately in the horizontal direction. In the diagram in FIG. 1, the shaft bearing 31 runs out from the plane of the drawing or into this. A propeller shaft (not shown here) which runs along the propeller axis 32, is mounted in this shaft bearing 31. In the diagram from FIG. 1 the propeller axis 32 also leads out from the plane of the drawing or into this. The propeller 33 is only indicated schematically as a propeller circle since this lies downstream of the flow-guiding surface 50 in the direction of travel and therefore outside the plane of the drawing. The present ship is a so-called single-propeller ship and therefore only has one propeller 33.

The flow-guiding surface 50 is located at a distance from the propeller upstream of the propeller 33. Furthermore, the flow-guiding surface 50 is configured to be plate-shaped and thus extends on a plane parallel to the propeller axis 32. The flow-guiding surface 50, as shown in FIG. 1, is located at a constant distance 54 from the propeller axis 32.

The device 100 shown in FIG. 1 has two first fins 50a projecting outwards from the flow-guiding surface 50. Each of these two first fins 50a is connected with its first end 501 to the flow-guiding surface 50. The respective second end 502 of the first fin 50a is configured as a free-standing end. Furthermore, the device shown in FIG. 1 has a second fin 51a. This second fin 51a is connected with its first end 503 to the flow-guiding surface 50. With its second end 504 the second fin 51a is connected to the shaft bearing 31.

Figure 2:
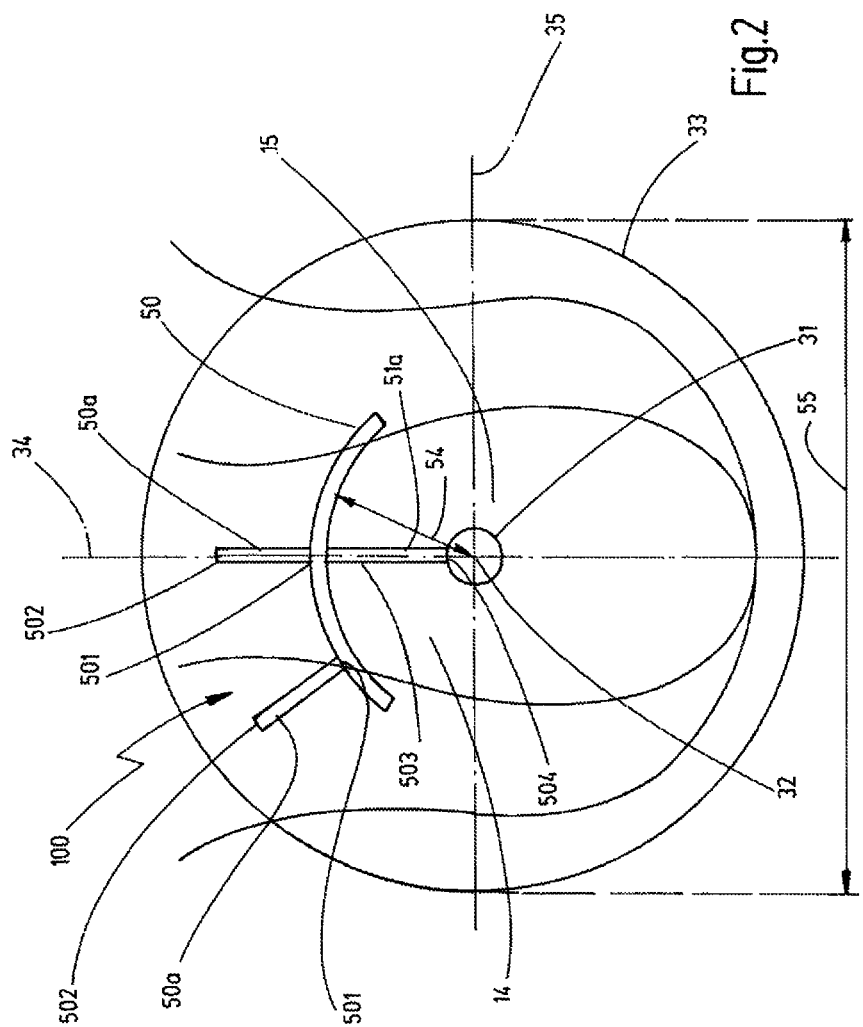
FIG. 2: shows a rear view of a lower region of a hull with a flow-guiding surface configured in an arcuate shape, arranged upstream of the propeller.

FIG. 2 shows a rear view of the rear region of a hull 30. The device according to FIG. 2 differs from the device according to FIG. 1 only in that the flow-guiding surface 50 is configured to be arcuate.

Figure 3:
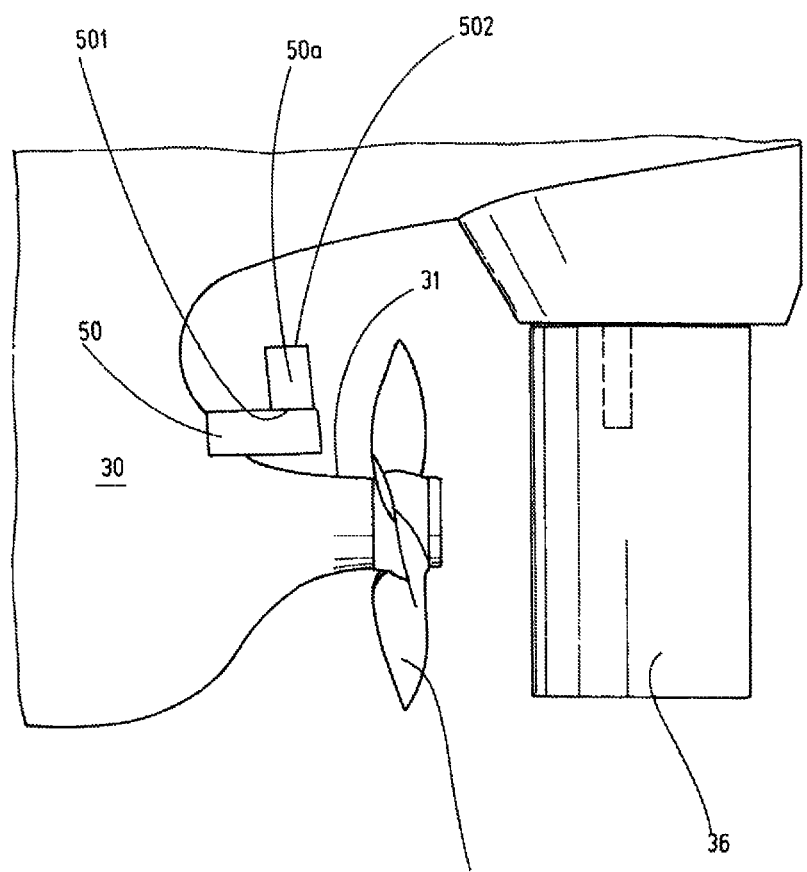
FIG. 3: shows a side view of a flow-guiding surface with a first fin.

FIG. 3 shows a side view of the lower stern section of a ship. Projecting approximately horizontally from the stern of a hull 30 is a shaft bearing 31 configured as a stern tube in which a propeller shaft (not shown here) is located. The propeller shaft runs along a propeller axis 32. A propeller 33 is provided at the end of the shaft bearing 31. Further, in the direction of travel upstream of the propeller 33 a flow-guiding surface 50 is shown at a distance from the propeller 33 and upstream of the propeller 33. Furthermore, a first fin 50a projecting outwards or upwards is located on the flow-guiding surface 50. The first fin 50a is connected with its first end 501 to the flow-guiding surface in the upper region of said arcuately configured flow-guiding surface 50 whilst its second end 502 is configured as a free-standing end.

Figure 4:
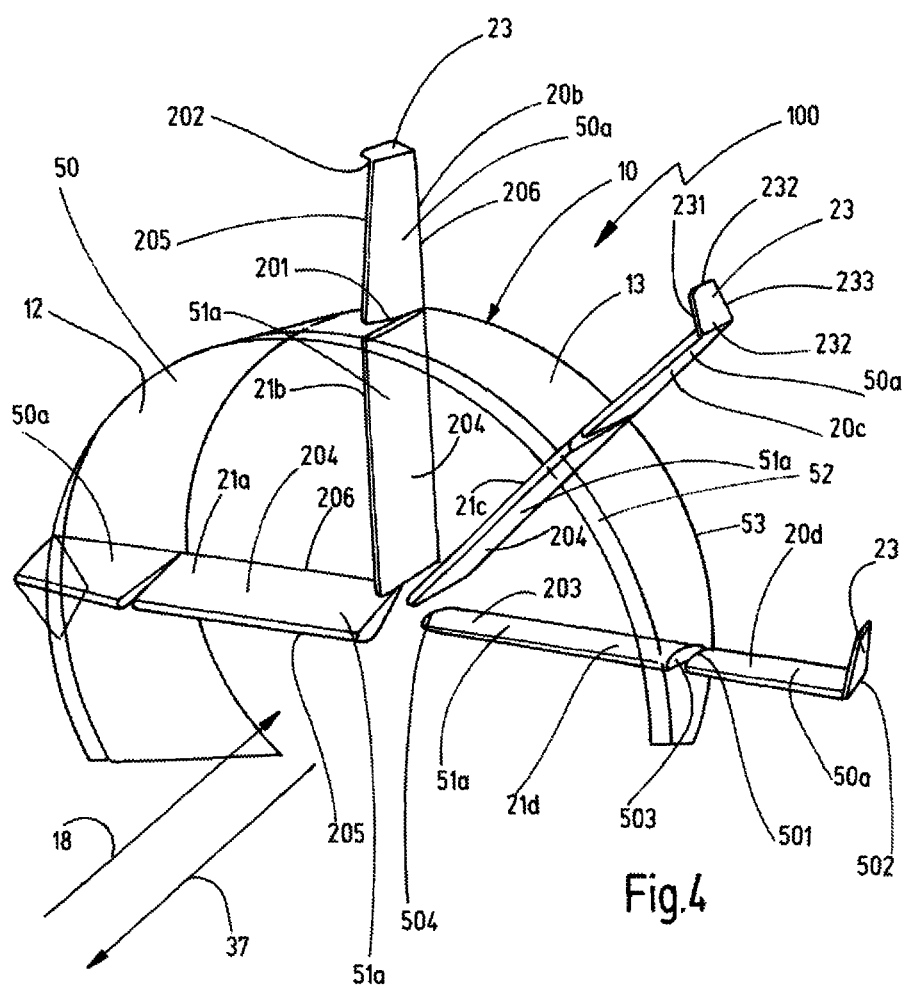
FIG. 4: shows a perspective view of a further embodiment with arcuately configured flow-guiding surface.
Figure 9:
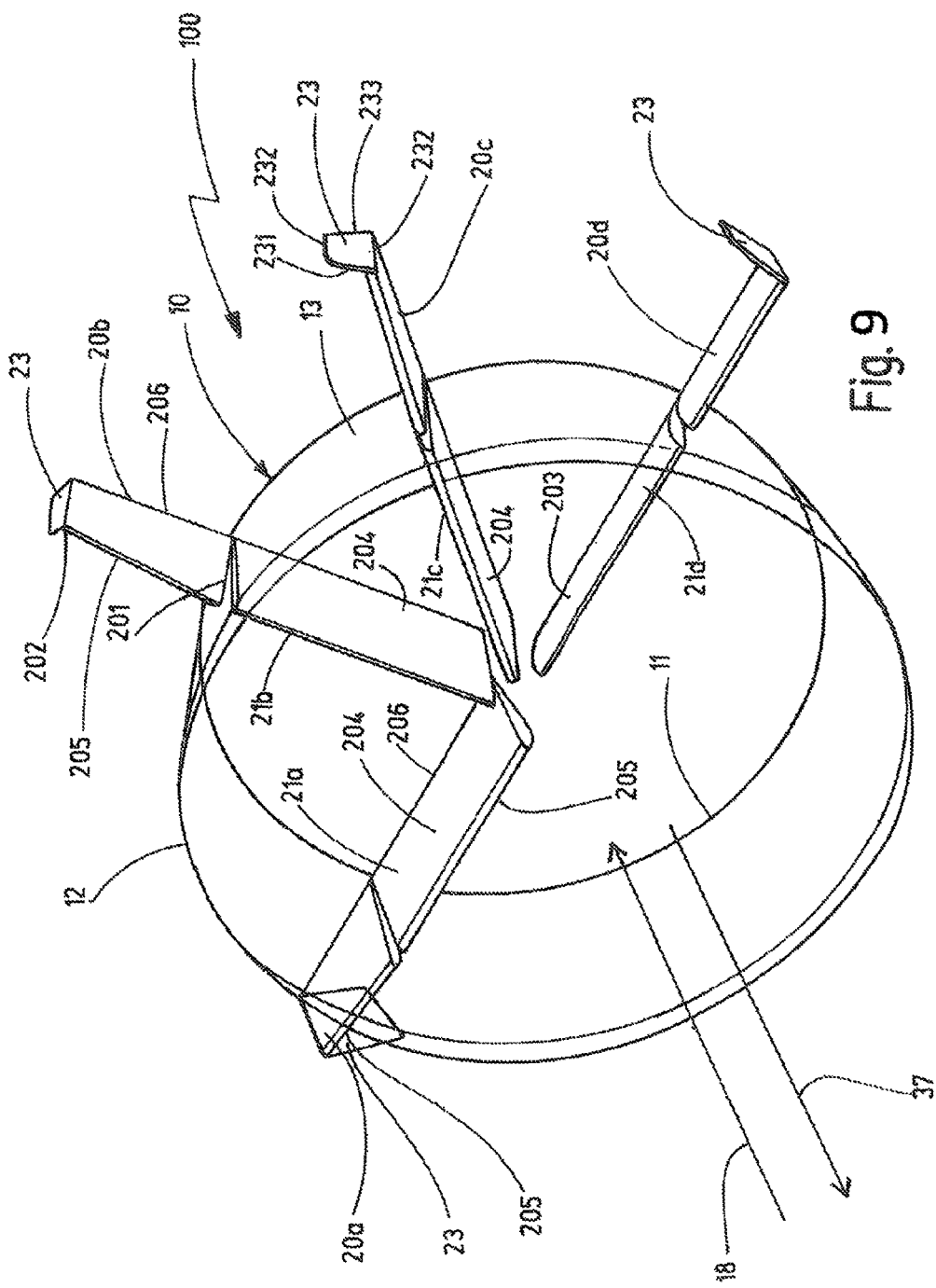
FIG. 9: shows a perspective view of a further embodiment of the device.

FIG. 4 shows a perspective view of a further embodiment of the device 100. This device 100 also comprises a fore-nozzle 10 configured to be open in the circumferential direction and four outer fins 20a to 20d as well as four inner fins 21a to 21d, where in each case a fin pair 20a, 21a; 20b, 21b; 20c, 21c; 20d, 21d forms a complete fin. Thus, according to FIG. 4, the flow-guiding surface 50 is configured as an open nozzle ring. The open nozzle ring corresponds approximately to a so-called two-thirds nozzle since this nozzle ring corresponds to approximately two thirds of a circumferentially closed nozzle. Furthermore, reference is made to the explanations to FIG. 9. FIG. 9 shows a similar embodiment where however, in contrast to the embodiment shown in FIG. 4, the device 100 in FIG. 9 shows a fore-nozzle 10 which is configured to be closed in the circumferential direction.

Figure 5:
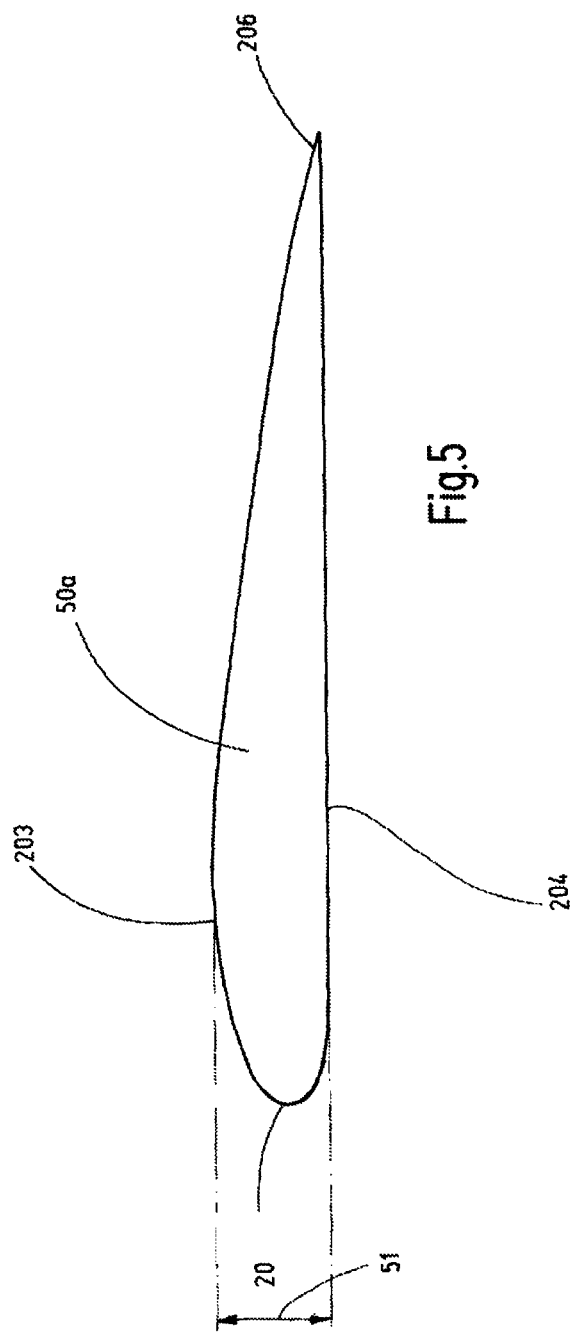
FIG. 5: shows a sectional view of a fin.

FIG. 5 shows a cross-sectional view of an example of a fin. The fin shown can in principle be the cross-section of a first fin 50a or second fin 51a. In the example shown in FIG. 5, the fin shown is the first fin 50a. The fin 50a has a curved suction side 203 arranged at the top in the drawing of FIG. 5 and an oppositely arranged, substantially flat pressure side 204. The rounded front face 205 which forms a part of the leading edge of the fin 50a would be placed in the flow in a state installed in the fore-nozzle 10, i.e. disposed upstream. To that effect, the approximately pointed rear face 206 (i.e. the profile end) which forms a part of the trailing edge of the fin 50a would be located downstream of the propeller flow in the state installed in a fore-nozzle 10.

Figure 6:
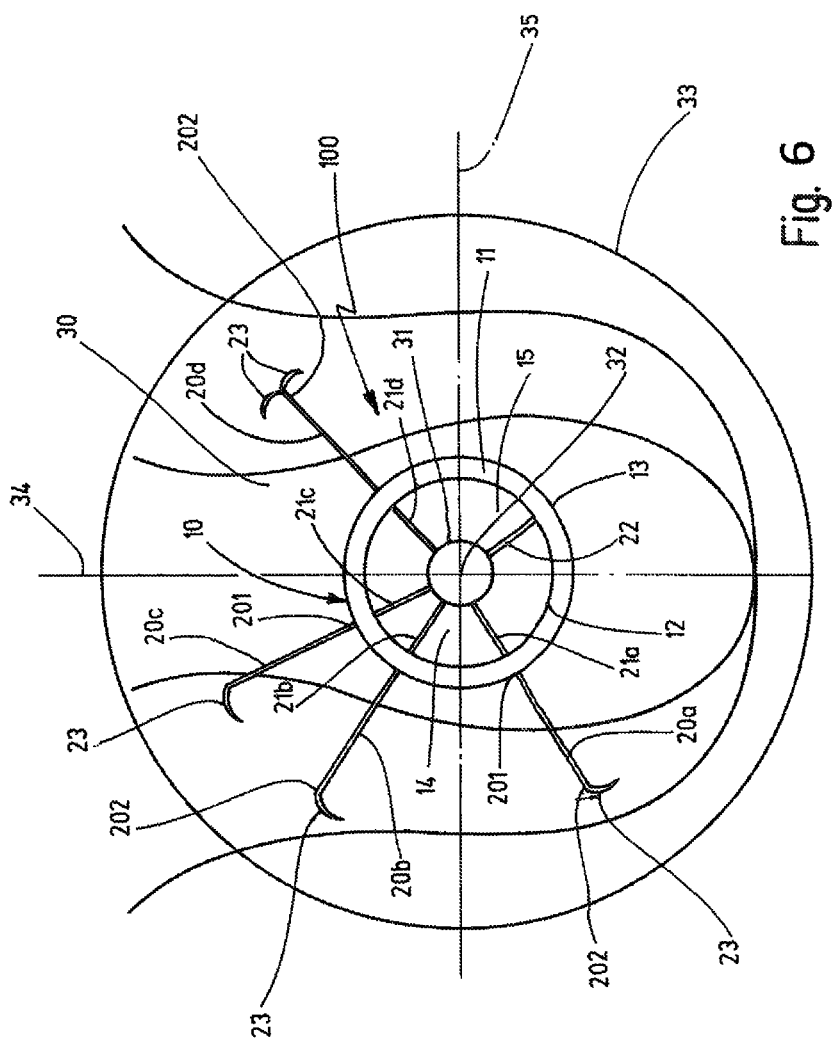
FIG. 6: shows a rear view of a lower region of a hull with fore-nozzle arranged coaxially with the propeller.

FIG. 6 shows a rear view of the rear lower region of a hull 30. A shaft bearing 31 configured as a stern tube projects from the hull 30 from the stern approximately in the horizontal direction. In the diagram in FIG. 6, the shaft bearing 31 runs out from the plane of the drawing or into this. A propeller shaft (not shown here) which runs along the propeller axis 32, is mounted in the shaft bearing 31. In the diagram from FIG. 6 the propeller axis 32 also leads out from the plane of the drawing or into this. The propeller axis 32 at the same time forms the longitudinal axis of a fore-nozzle 10 arranged concentrically about the propeller axis 32. Since the fore-nozzle 10 in the present exemplary embodiment is shown as a rotationally symmetrical body, the propeller axis 32 at the same time also forms the axis of rotation of the fore-nozzle 10. The propeller 33 is only indicated schematically as a propeller circle since this lies downstream of the fore-nozzle 10 in the direction of travel and therefore outside the plane of the drawing. The present ship is a so-called single-propeller ship and therefore only has one propeller 33.

The fore-nozzle 10 has a circumferentially closed nozzle wall 11 which in turn comprises an inner wall surface 12 and an outer nozzle wall surface 13. A vertical central line 34 and a horizontal central line 35 is drawn through the propeller 33. Since the fore-nozzle 10 is arranged concentrically to the propeller 33, the central lines 34, 35 are also central lines for the fore-nozzle 10. The propeller axis 32 lies at the point of intersection of the two central lines 34, 35. In an imaginary division of the fore-nozzle 10 by the vertical central line 34, the left fore-nozzle half is the propeller upwards-beating side 14 of the fore-nozzle 10 and the right fore-nozzle half is the propeller downwards-beating side 15 of the fore-nozzle 10.

Inner fins 21a, 21b, 21c each arranged to run between the shaft bearing 31 and the inner side 12 of the fore-nozzle wall 11 are provided on the propeller upwards-beating side 14 of the fore-nozzle 10 (in relation to a right-handed propeller). Another inner fin 21d which also runs between shaft bearing 31 and fore-nozzle wall 11 is mounted on the propeller downwards-beating side 15 and specifically above the horizontal central line 35. The inner fins 21a, 21b, 21c, 21d are each fastened on the shaft bearing 31 and on the fore-nozzle 10. From the outer fore-nozzle wall surface 13, four outer fins 20a, 20b, 20c, 20d project outwards from the fore-nozzle 10. The outer fins 20a, 20b, 20c, 20d are each arranged in extension of the inner fins 21a, 21b, 21c, 21d. The outer fins 20a, 20b, 20c, 20d and also the inner fins 21a, 21b, 21c, 21d are all arranged radially to the propeller axis 32 or the axis of rotation of the fore-nozzle and run accordingly in the radial direction to the propeller axis 32. The longitudinal axis of the inner fins 21a, 21b, 21c, 21d approximately corresponds to the longitudinal axis of the outer fins 20a, 20b, 20c, 20d in an imaginary extension. Therefore the individual fin pairs 20a, 21a; 20b, 21b; 20c, 21c; 20d, 21d; each form a complete fin. That is, they act fluidically approximately as a continuous fin but are de facto interrupted by the fore-nozzle 10 and each fastened thereon (for example, by welding or by welding to the fore-nozzle). The device 100 thereby acquires a high stability with a relatively large length of the complete fin.

Overall three complete fins are arranged on the propeller upwards-beating side 14 and one complete fin on the propeller downwards-beating side 15. On the propeller downwards-beating side 15 and specifically below the horizontal central line 35, there is further provided a stabilizing strut 22 which runs between shaft bearing 31 and fore-nozzle 10 and is connected to both. This stabilizing strut 22 is configured in such a manner that it acts as a compression or tension rod and fastens the fore-nozzle 10 to the hull and stabilizes this. The stabilizing strut 22 is not configured as a fin, i.e. it does not have a hydrofoil profile or the like but is configured in such a manner that it influences the flow as little as possible. The stabilizing strut 22 has a greater profile width compared with the fins 20a, 20b, 20c, 20d, 21a, 21b, 21c, 21d.

The outer fins 20a, 20b, 20c, 20d each have a first end 201 which is disposed on the outer wall surface 13 of the fore-nozzle 10 and is connected to the fore-nozzle 10. The outer fins also have a second end 202 opposite the first end 201 which is configured as a free end. Fin end pieces 23 project laterally from the second end 202. In the diagram in FIG. 6, the fin end pieces 23 each point towards the lower side of the outer fins 20a, 20b, 20c, which forms the suction side. At the outer fin 20d, two fin end pieces 23 which are arranged symmetrically to one another are provided on the free end 202. One fin end piece 23 protrudes towards the upper side and one towards the lower side of the outer fin 20d. The fin end pieces 23 act as "winglets" and reduce the occurrence of so-called detachment turbulence and cavitation in the region of the free ends 202 of the outer fins 20a, 20b, 20c, 20d. The fin end pieces 23 each go over into the respective outer fin 20a, 20b, 20c, 20d at a radius.

Figure 7:
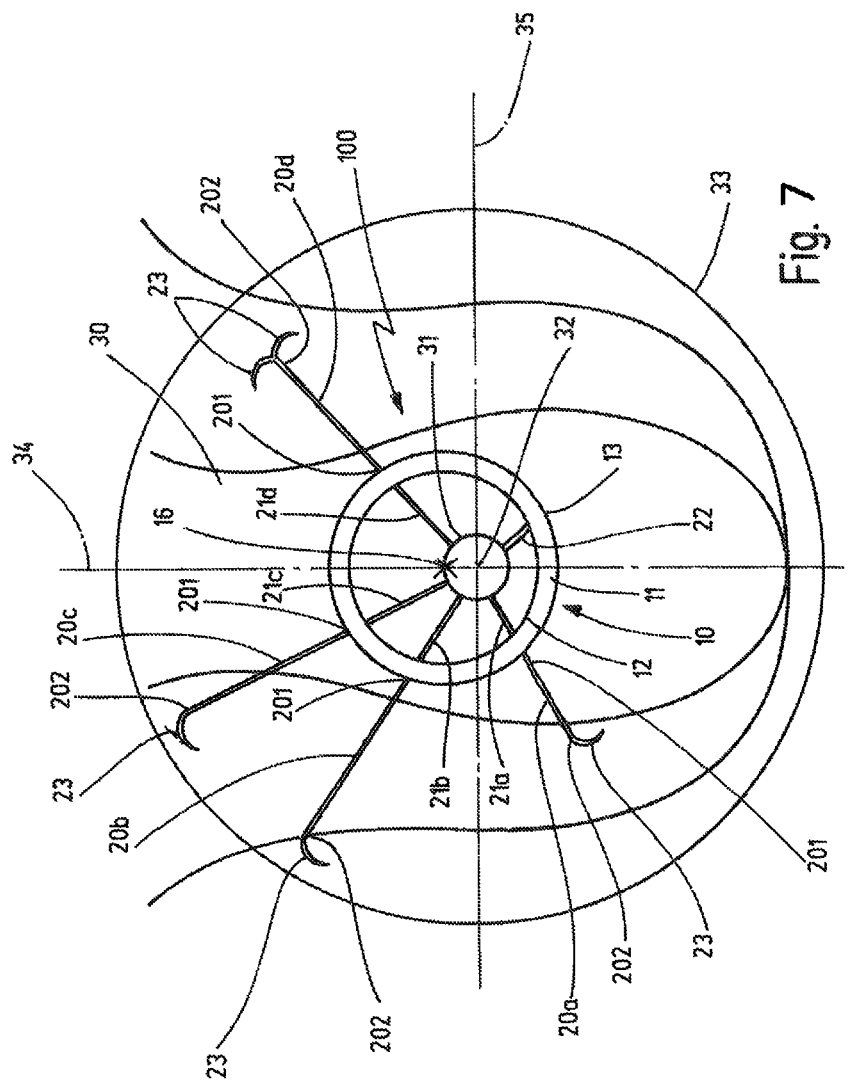
FIG. 7: shows a rear view of a lower part of a hull with fore-nozzle shifted upwards with respect to the propeller axis.

FIG. 7 shows a similar view to FIG. 6. In the embodiment according to FIG. 7, unlike FIG. 6, the fore-nozzle 10 with its axis of rotation 16, which at the same time also forms the longitudinal axis of the fore-nozzle 10, is shifted upwards with respect to the propeller axis 32. Accordingly, the inner fins 21a, 21b, 21c, 21d have different lengths whereas in the diagram from FIG. 6 the inner fins 21a, 21b, 21c, 21d all have the same length. The stabilizing strut 22 is also shortened compared with the embodiment from FIG. 6. In the diagram from FIG. 7, the outer fins 20a, 20b, 20c, 20d furthermore also have different lengths whereas in the diagram from FIG. 6 the outer fins 20a, 20b, 20c, 20d each have the same length. Both in the embodiment from FIG. 6 and in the embodiment from FIG. 7, the radius of the propeller 33 is in each case greater than the length of the (longest) complete fin. In the embodiment from FIG. 7 the length of the longest complete fin (for example, composed of outer fin 20c and inner fin 21c) is longer than the complete fin from FIG. 6.

Figure 8:
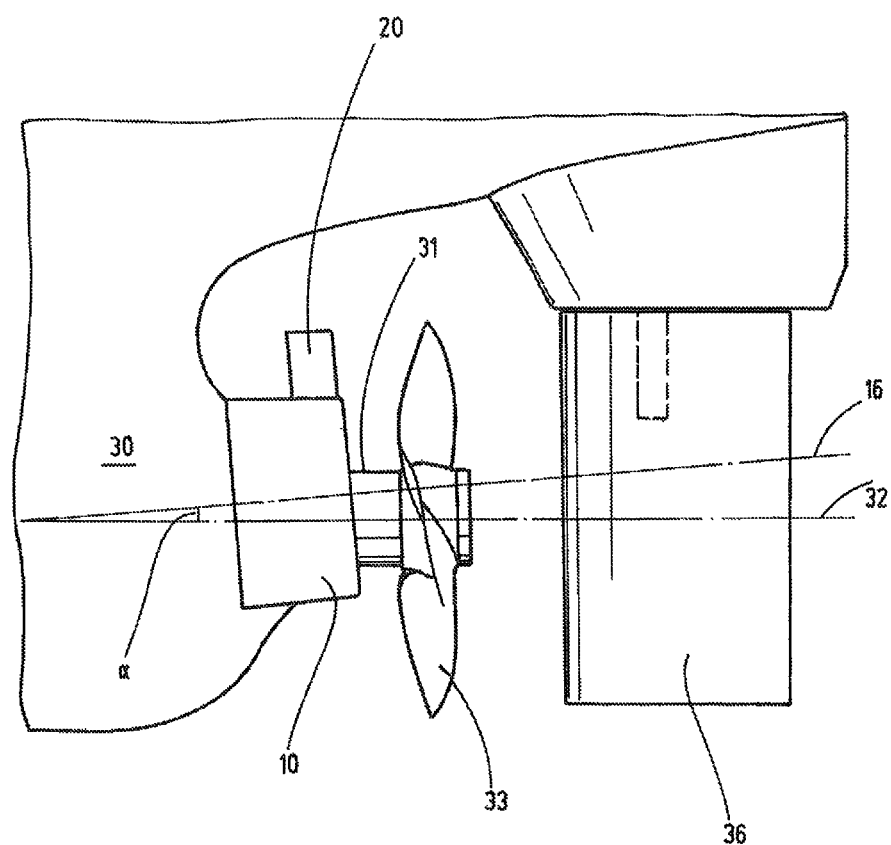
FIG. 8: shows a side view of a fore-nozzle with outer fin which is inclined with respect to the propeller axis.

FIG. 8 shows a side view of the lower stern section of a ship. A shaft bearing 31, configured as a stern tube in which a propeller shaft (not shown here) is arranged, projects approximately horizontally from the stern of a hull 30. The propeller shaft runs along a propeller axis 32. A propeller 33 is provided at the end of the shaft bearing 31. A fore-nozzle 10 is further provided in the direction of travel ahead of the propeller 33. The axis of rotation or longitudinal axis 16 runs centrally through the rotationally symmetrical fore-nozzle 10. The fore-nozzle 10 is shifted upwards with its axis of rotation 16 with respect to the propeller axis 32. Furthermore, the axis of rotation 16 is inclined at an angle α with respect to the propeller axis 32. That is, the fore-nozzle 10 is aligned or arranged with its leading upper edge region, when viewed in the direction of travel, inclined or tilted forwards and downwards with respect to the propeller axis 32. In the upper region of the fore-nozzle 10, an outer fin 20 projects upwards from the fore-nozzle 10. The outer fin 20 is located in the trailing region of the fore-nozzle 10 facing the propeller 33 when viewed in the direction of travel. A rudder 36 for manoeuvring the ship is provided downstream of the propeller 33 in the direction of travel.

FIG. 9 shows a perspective view of another embodiment of the device 100 according to the invention. This device 100 also comprises a nozzle ring closed into itself in the circumferential direction or a fore-nozzle 10 and four outer fins 20a to 20d and four inner fins 21a to 21d, where respectively one pair of fins 20a, 21a; 20b, 21b; 20c, 21c; 20d, 21d forms a complete fin. The individual fins 20a to 20d; 21a to 21d each have a cross-sectional profile in the manner as shown in FIG. 5. In particular, each of the fins 20a to 20d; 21a to 21d comprises a suction side 203 and a pressure side 204. The fins 20a to 20d; 21a to 21d are each disposed in the rear region of the fore-nozzle 10. The diagram in FIG. 9 shows a type of exploded view so that the individual fins 20a to 20d; 21a to 21d are not shown continuously in their state connected to the fore-nozzle 10. Both the outer fins 20a to 20d and the inner fins 21a to 21d are disposed in the rear region of the fore-nozzle 10 when viewed in the direction of travel 37. In particular, the rear region is no longer than 70%, preferably 55%, of the total length of the fore-nozzle 10 when viewed in the direction of travel. The fore-nozzle 10 is shown transparent in FIG. 9 so that for reasons of clarity the outer fins 20a to 20d and the inner fins 21a to 21d are each completely identifiable.

The fin end pieces 23 which are attached to each of the second ends 202 of the outer fins 20a to 20d are configured in the manner of plates and project laterally on one side from the outer fins 20a to 20d. The edge 231 of the fin end pieces 23 configured as plates, facing the leading edge or the front face 205 of the outer fins 20a-20d runs laterally to the main inflow direction 18 of the fore-nozzle 10 and slightly obliquely rearwards. The two lateral edges 232 of the fin end pieces 23 are aligned approximately parallel to the main inflow direction 18 whilst the trailing edge 233 of the fin end pieces 23 runs substantially orthogonally to the main inflow direction 18. In relation to the longitudinal direction of the outer fins 20a to 20d, the fin end pieces 23 protrude outwards at an angle of 90° to 120° where the fin end pieces 23 in the case of a right-handed propeller protrude laterally from the outer fins 20a to 20d in the direction of rotation of the propeller. In the device 100 from FIG. 9, the inner fins 21a to 21d each have a greater length than the outer fins 20a to 20d. Furthermore all the outer fins 20a to 20d have the same dimensions in relation to their length, width and depth, and also profile shape. The same applies similarly for the inner fins 21a to 21d. Since the inner fins 21a to 21d have the same length, the axis of rotation or longitudinal axis of the fore-nozzle 10 is arranged coaxially with the propeller axis, that is the two axes lie one upon the other.

The outer fins 20a to 20d are configured to be swept whereas the inner fins 21a to 21d are configured to be non-swept. This can be seen in detail in the diagram in FIG. 10 which shows the device 100 from FIG. 9 in a side view. The axis of rotation or longitudinal axis 16 of the fore-nozzle 10 is indicated in the diagram in FIG. 10. A first upwardly-projecting orthogonal 17a and a second downwardly-projecting orthogonal 17b to the axis of rotation 16 is indicated. The fore-nozzle 10 is shown transparent in FIG. 10 so that for reasons of clarity the interior inner fins 21b to 21d can be identified. It can further be identified that the leading edge 205 of the inner fin 21b is disposed substantially parallel to the orthogonal 17a. It can also be identified that the trailing edge 206 of the inner fin 21d is disposed substantially parallel to the orthogonal 17b. Since the inner fins 21b to 21d have the same configuration, these parallel arrangements apply similarly for all inner fins 21b to 21d. In other words, the depth of the inner fins 21b to 21d when viewed in the main inflow direction 18 or when viewed in the direction of travel 37 is substantially constant over the length of the inner fins 21b to 21d. The inner fins 21b to 21d are accordingly configured to be non-swept.

In contrast to this, the outer fins 20b to 20d are configured to be swept and specifically having a leading-edge sweep. Accordingly, the leading edge 205 of the outer fin 20b is aligned at a sweep angle β to the orthogonal 17a. This applies similarly for the remaining outer fins as a result of the same configuration. The trailing edges 206 of the outer fins 20b to 20d are again aligned substantially parallel to the orthogonals 17a, 17b so that the trailing edge of the outer fins 20b to 20d is not swept, that is, not inclined at an angle to the orthogonals. Accordingly the depth of the outer fins 20b to 20d decreases when viewed in the direction of travel 37 from the first end 201 to the second end 202. Since the leading edge 205 is rectilinear, the decrease from one end 201 to the other end 202 is continuous. The outer fin 20a and inner fin 21a not shown in FIG. 10 are configured similarly to the other inner fins 21b to 21d and outer fins 20b to 20d.

Figure 10:
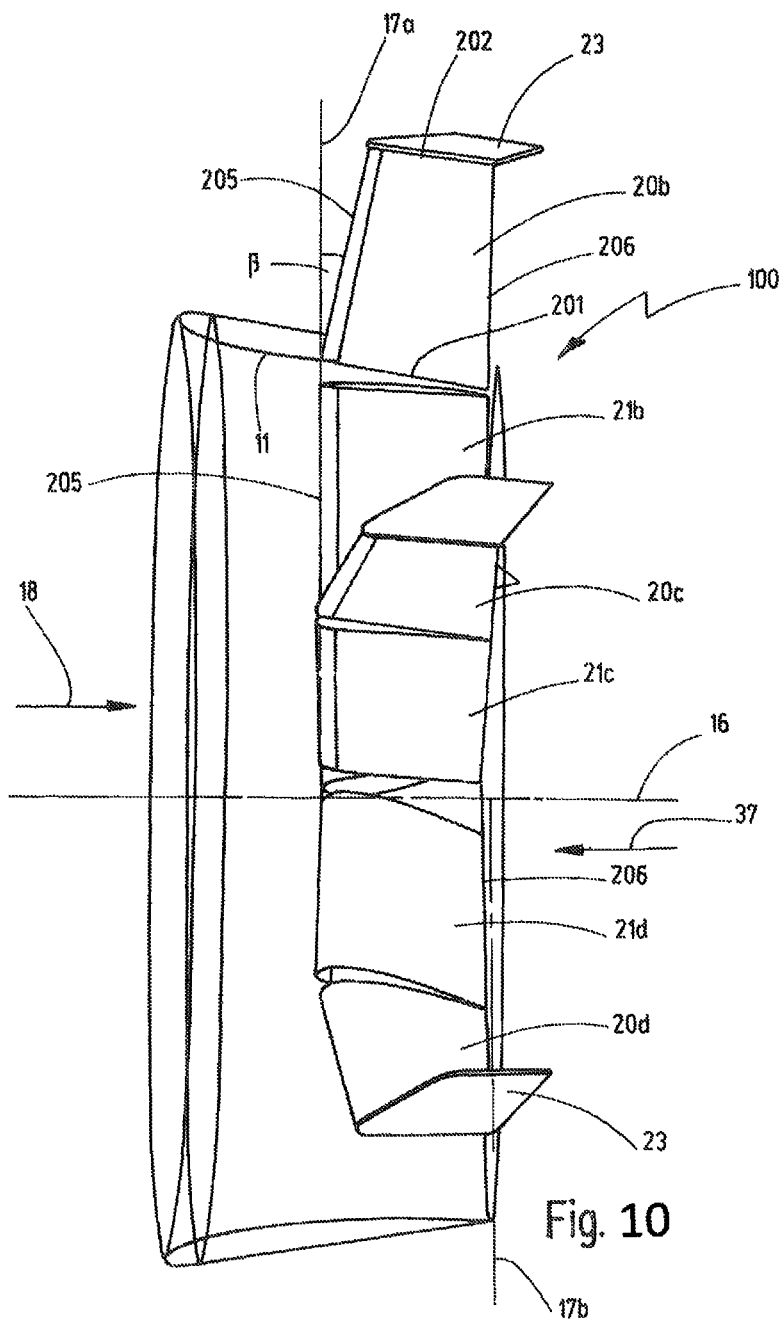
FIG. 10: shows a side view of the device from FIG. 9.

It can be further identified in FIG. 10 that the outside diameter of the fore-nozzle 10 decreases continuously in the main inflow direction 18. Likewise, the inside diameter of the fore-nozzle 10 decreases in the main inflow direction 18 but not continuously as a result of the arcuate configuration of the inner fore-nozzle wall surface 11 in profile view.

Figure 11:
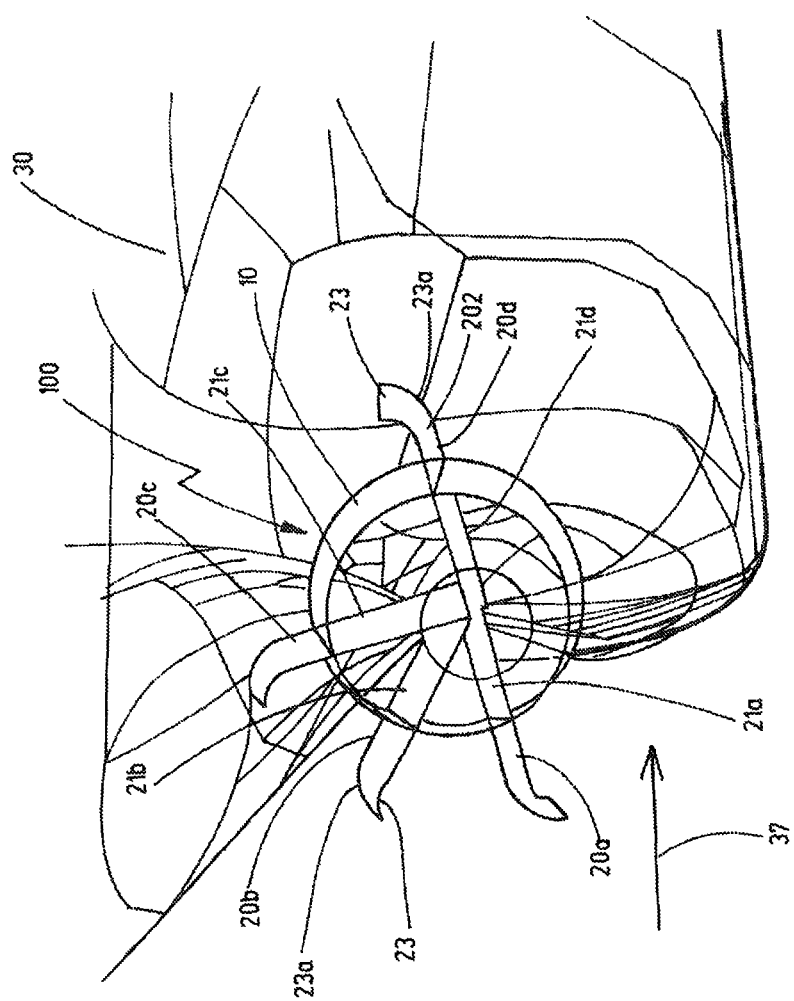
FIG. 11: shows a perspective view of a further embodiment of the device installed on a hull.

FIG. 11 shows another embodiment of a device 100 according to the invention which is configured similarly to that from FIGS. 9 and 10. In particular this device 100 also comprises four outer fins 20a to 20d and four inner fins 21a to 21d where respectively one fin pair forms a complete fin. Both in the embodiment from FIG. 11 and also in the embodiment from FIGS. 9 and 10, and 1 and 2, the complete fins are arranged asymmetrically inside the fore-nozzle 10.

In contrast to the embodiment according to FIGS. 9 and 10, in the embodiment from FIG. 11 the second end 203 of the outer fins 20a to 20d does not go over into the fin end pieces 23 at an angle, but with a transition 23a having a radius. Furthermore, in FIG. 11 the complete fins run through the fore-nozzles 10, that is, the complete fins are formed in one piece whereas in the embodiment from FIGS. 9 and 10 the complete fins are each formed in two pieces and the inner fins and outer fins are each fastened separately to the fore-nozzle 10. Another difference in the embodiment according to FIG. 11 with respect to the embodiment according to FIGS. 9 and 10 consists in that both the inner fins 21a to 21d and also the outer fins 20a to 20d are configured to be swept. Here also only the leading edge of the fin is configured to be swept in each case, but not the trailing edge. The sweep of the leading edges of the inner fins 21a to 21d is accomplished at the same angle with respect to an orthogonal to the axis of rotation as for the outer fins 20a to 20d so that a continuous leading-edge sweep with a constant angle is obtained.

It can further be identified in FIG. 11 that the device 100 is mounted on the hull 30 and specifically in the direction of travel 37 at the rear end of the hull 30.

The invention claimed is:

1. A device for improving water influx towards a propeller of a watercraft, the device comprising a flow-guiding surface, wherein a first fin or a plurality of first fins project from the flow-guiding surface, wherein a first end of the first fin is fastened to the flow-guiding surface and a second end of the first fin is configured as a free end, and wherein a second fin or a plurality of second fins project from the flow-guiding surface, wherein a first end of the second fin is disposed on the flow-guiding surface, and the second fin is mounted with a second end on a hull and/or on a shaft bearing which is configured for mounting a propeller shaft of the propeller of the watercraft, a length of the first fin being at least one and a half times as great as a length of the second fin, wherein on a propeller upwards-beating side of the flow-guiding surface more of the first fins or the second fins are provided than on a propeller downwards-beating side of the flow-guiding surface, and wherein the first fins and/or the second fins can form an asymmetric first fin system or an asymmetric second fin system.

2. The device according to claim 1, wherein the flow-guiding surface is disposed upstream of the propeller, wherein the flow-guiding surface is disposed at a distance from the propeller, wherein the flow-guiding surface is disposed at a distance from a shaft bearing which is configured for mounting a propeller shaft of the propeller of the watercraft.

3. The device according to claim 1, wherein a distance between a propeller axis and the first end of the first fin is shorter than the distance between the propeller axis and the second end of the first fin and/or wherein the first fin has a greatest profile thickness, and wherein the greatest profile thickness of the first fin is less than 25% of the distance between the first end and the second end of the first fin.

4. The device according to claim 1, wherein the flow-guiding surface has a front-side profile inlet edge which is directed away from the propeller and that the flow-guiding surface has a front-side profile outlet edge which is directed towards the propeller, wherein a distance between a propeller axis and the profile inlet edge is smaller than or greater than the distance between the propeller axis and the profile outlet edge, and/or wherein a shortest distance between the flow-guiding surface and the propeller axis is less than half a propeller diameter.

5. The device according to claim 1, wherein the first fin and/or the second fin are disposed radially to a propeller axis of the propeller of the watercraft.

6. The device according to claim 5, wherein the first fin extends from the second fin, wherein the first and second fins together form a complete fin having a length.

7. The device according to claim 6, wherein the length of the complete fin is greater than or smaller than a radius of the propeller of the watercraft.

8. The device according to claim 6, wherein the complete fin is swept.

9. The device according to claim 6, wherein the length of the complete fin is smaller than a radius of the propeller of the watercraft, wherein the length of the complete fin is a maximum of 75% of the radius of the propeller.

10. The device according to claim 5, wherein the first fin and/or the second fin are arranged at an angle of attack to the propeller axis.

11. The device according to claim 5, wherein the first fin and/or the second fin are swept.

12. The device according to claim 1, including a fin end piece protruding from the free end of the first fin.

13. The device according to claim 12, wherein the fin end piece is disposed on the free end of the first fin at a radius or at an angle.

14. The device according to claim 12, wherein the fin end piece protrudes from a suction side of the first fin.

15. The device according to claim 1, wherein the flow-guiding surface has a length, and wherein a greatest profile thickness of the flow-guiding surface is less than 10% of the length of the flow-guiding surface.

16. The device according to claim 1, wherein between the flow-guiding surface and a propeller axis at least one stabilizing strut is provided for stabilizing the flow-guiding surface, wherein the stabilizing strut is fastened with one end on the flow-guiding surface and with another end on a shaft bearing, which is configured for mounting the propeller shaft of the propeller of the watercraft.

17. The device according to claim 16, wherein the stabilizing strut has a hydrofoil profile.

18. The device according to claim 1, wherein the flow-guiding surface is configured to be circumferentially open or closed, and/or wherein the flow-guiding surface is configured to be straight, and/or wherein the flow-guiding surface is configured to be convex with respect to a propeller axis, and/or wherein the flow-guiding surface is configured to be arcuate and circumferentially open, wherein an arc length of the flow-guiding surface when considering a cross-section of the flow-guiding surface is less than 80% of the circumference of a circumferentially closed flow-guiding surface.

19. The device according to claim 18, wherein the arc length of the flow-guiding surface when considering a cross-section of the flow-guiding surface is less than 40% of the circumference of the circumferentially closed flow-guiding surface.

20. The device according to claim 1, wherein the flow-guiding surface is configured as a nozzle.

21. The device according to claim 1, wherein a greatest profile thickness of the flow-guiding surface is less than 7.5% of a length of the flow-guiding surface.

22. The device according to claim 1, including a fore-nozzle, wherein a diameter of the fore-nozzle is less than 70% of the propeller of the watercraft.

23. The device according to claim 22, wherein the diameter of the fore-nozzle is less than 50% of the diameter of the propeller of the watercraft.

* * * * *